United States Patent [19]

Coschieri

[11] Patent Number: 5,179,710
[45] Date of Patent: Jan. 12, 1993

[54] INTERFACE FOR AMPLIFYING LOGIC SIGNAL FROM A SIGNAL LINE HAVING A PREDETERMINED LOGIC STATE TO SUPPLY POWER TO PERIPHERAL DEVICE

[75] Inventor: Jean-Claude Coschieri, Trelaze, France

[73] Assignee: Laboratoire Europeen de Recherches Electroniques Avancees, Courbevoie, France

[21] Appl. No.: 851,247

[22] Filed: Mar. 13, 1992

Related U.S. Application Data

[63] Continuation of Ser. No. 441,656, Nov. 27, 1989, abandoned.

[30] Foreign Application Priority Data

Nov. 30, 1988 [FR] France ............................. 88 15667

[51] Int. Cl.⁵ .............................................. G06F 1/26
[52] U.S. Cl. ................................. 395/750; 364/238.5;
364/273.2; 364/273.5; 364/273.3; 364/922.7;
364/927.92; 364/927.94; 364/927.99; 364/929;
364/DIG. 1; 395/500
[58] Field of Search ............... 395/325, 750, 500;
307/456, 455, 270, 253

[56] References Cited

U.S. PATENT DOCUMENTS

| | | | |
|---|---|---|---|
| 4,144,565 | 3/1979 | Bouknecht et al. | 364/200 |
| 4,578,533 | 3/1986 | Pierce | 375/8 X |
| 4,592,069 | 5/1986 | Redding | 375/8 |
| 4,631,698 | 12/1986 | Walsh et al. | 364/900 |
| 4,794,525 | 12/1988 | Pickert et al. | 364/200 |
| 4,851,715 | 7/1989 | Strong | 307/456 |
| 4,866,602 | 9/1989 | Hall | 364/200 |
| 4,884,287 | 11/1989 | Jones et al. | 375/121 |

FOREIGN PATENT DOCUMENTS 2154834 9/1985 United Kingdom .

OTHER PUBLICATIONS

Electronic Design, vol. 31, No. 13, Jun. 23, 1983, pp. 166 & 168, Waseca, Minn., Denville, N.J. USA, W. Freeman, "Remote Display Draws Power from RS-232 Line".
David J. Comer, "Modern Electronic Circuit Design" 1968 Addison-Wesley Publishing Company pp. 187-190.

*Primary Examiner*—Thomas C. Lee
*Assistant Examiner*—Ken S. Kim
*Attorney, Agent, or Firm*—Oblon, Spivak, McClelland, Maier & Neustadt

[57] ABSTRACT

The disclosure pertains chiefly to an interface including an electrical supply. The disclosure concerns an interface capable of providing an external supply from the amplification of one of the signals. For example, the amplified $\overline{DTR}$ is used to give a supply voltage to a MIDI interface from an RS 232 serial interface using a nine-pin SUB D9M connector. The disclosure can be applied to the making of interfaces capable of giving an electrical supply to an external device as well as to computers including such interfaces. The disclosure can be applied chiefly to the making of computers capable of working under the MS-DOS operating system and capable of providing a supply voltage to the MIDI interface by means of an RS 232 serial interface and a SUB D9M connector.

10 Claims, 2 Drawing Sheets

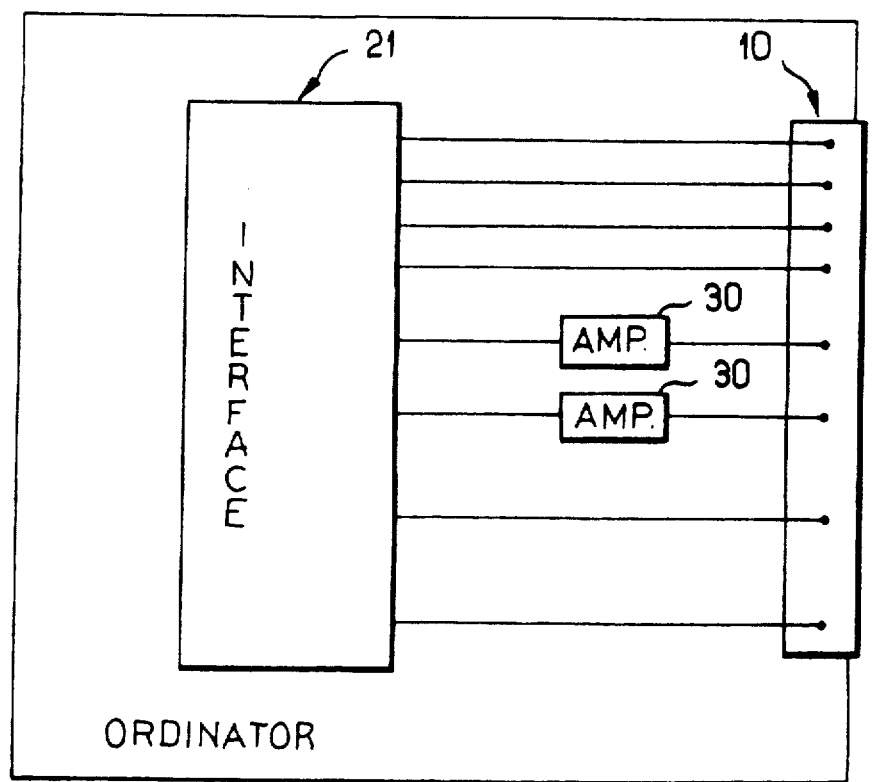
FIG_1
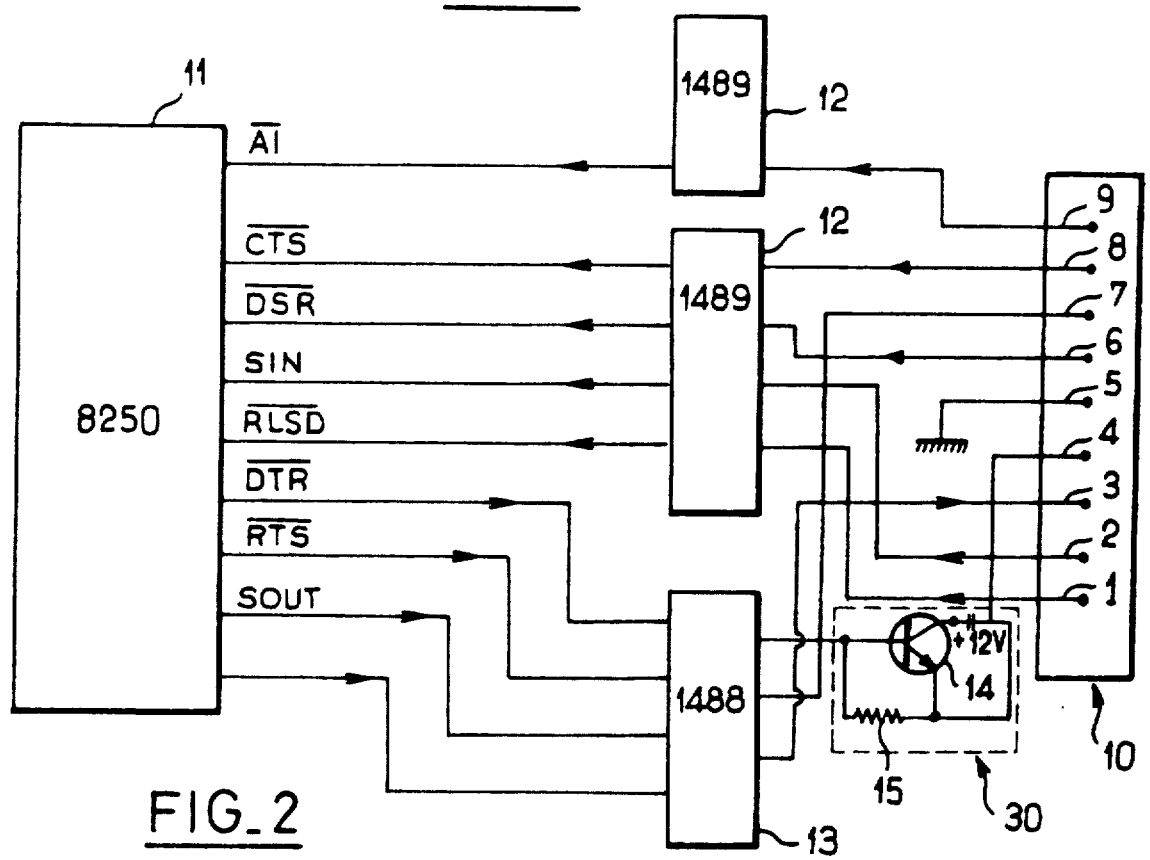
FIG_2

INTERFACE FOR AMPLIFYING LOGIC SIGNAL FROM A SIGNAL LINE HAVING A PREDETERMINED LOGIC STATE TO SUPPLY POWER TO PERIPHERAL DEVICE

This application is a continuation of application Ser. No. 07/441,656, filed on Nov. 27, 1989, now abandoned.

BACKGROUND OF THE INVENTION

1. Field of the Invention

The invention pertains to an interface with an electrical supply.

2. Description of the Prior Art

The space occupied by electronic instruments can be reduced by taking advantage of the miniaturization of modern components. However, certain instruments such as, for example, computers have to be capable of communicating with the exterior by means of appropriate interfaces and connectors. Thus, the reduction of the number of pins of the connectors enables the space that it occupies to be reduced, but limits its possibilities. For example, in serial links between computers, there has been a change from a connector with 25 pins to a connector with 9 pins called SUB D9M. This connector has a smaller space factor but all its pins are used. Thus it is not possible to add on, for example, a supply for an external peripheral. Thus, in prior art computers, it is not possible to use the serial link to connect an external peripheral that has to be supplied with current, for example a peripheral such as a MIDI interface designed for the driving of musical instruments. Now, it turns out that certain signals emitted by the serial link may, provided that they are amplified, act as external electrical supplies inasmuch as their voltage remains constant for the stage during which the external peripheral needs to be supplied. For example, the signal called DTR or $\overline{DTR}$ (Data Terminal Ready) is amplified to supply an external MIDI interface. The MIDI interface draws 5 volts from a voltage approximately equal to 12 volts given by the interface according to the present invention.

SUMMARY OF THE INVENTION

A main object of the invention is an interface comprising means to amplify one of the signals so that it is possible to provide an electrical supply to an external device.

Another object of the invention is an interface wherein an amplification means includes a transistor.

Another object of the invention is an interface wherein the transistor is of the NPN type.

Another object of the invention is an interface which is an RS 232 type serial interface.

Another object of the invention is an interface wherein the DTR (Data Terminal Ready) signal of the RS 232 serial interface is used.

Another object of the invention is an interface comprising a resistor parallel mounted with the transistor.

Another object of the invention is an interface comprising a nine-pin connector of the SUB D9M type.

Another object of the invention is a computer including an interface.

Another object of the invention is a computer capable of working under the MS-DOS operating system.

Another object of the invention is a device including a MIDI interface and a computer wherein the MIDI interface is connected to the computer by means of the interface.

BRIEF DESCRIPTION OF THE DRAWINGS

The invention will be better understood from the following description and from the appended figures, given as non-restrictive examples, wherein:

FIG. 1 is a diagram of a device according to the present invention;

FIG. 2 is a diagram of a particular exemplary embodiment of the device according to the present invention;

DESCRIPTION OF A PREFERRED EMBODIMENT

Figure 3:
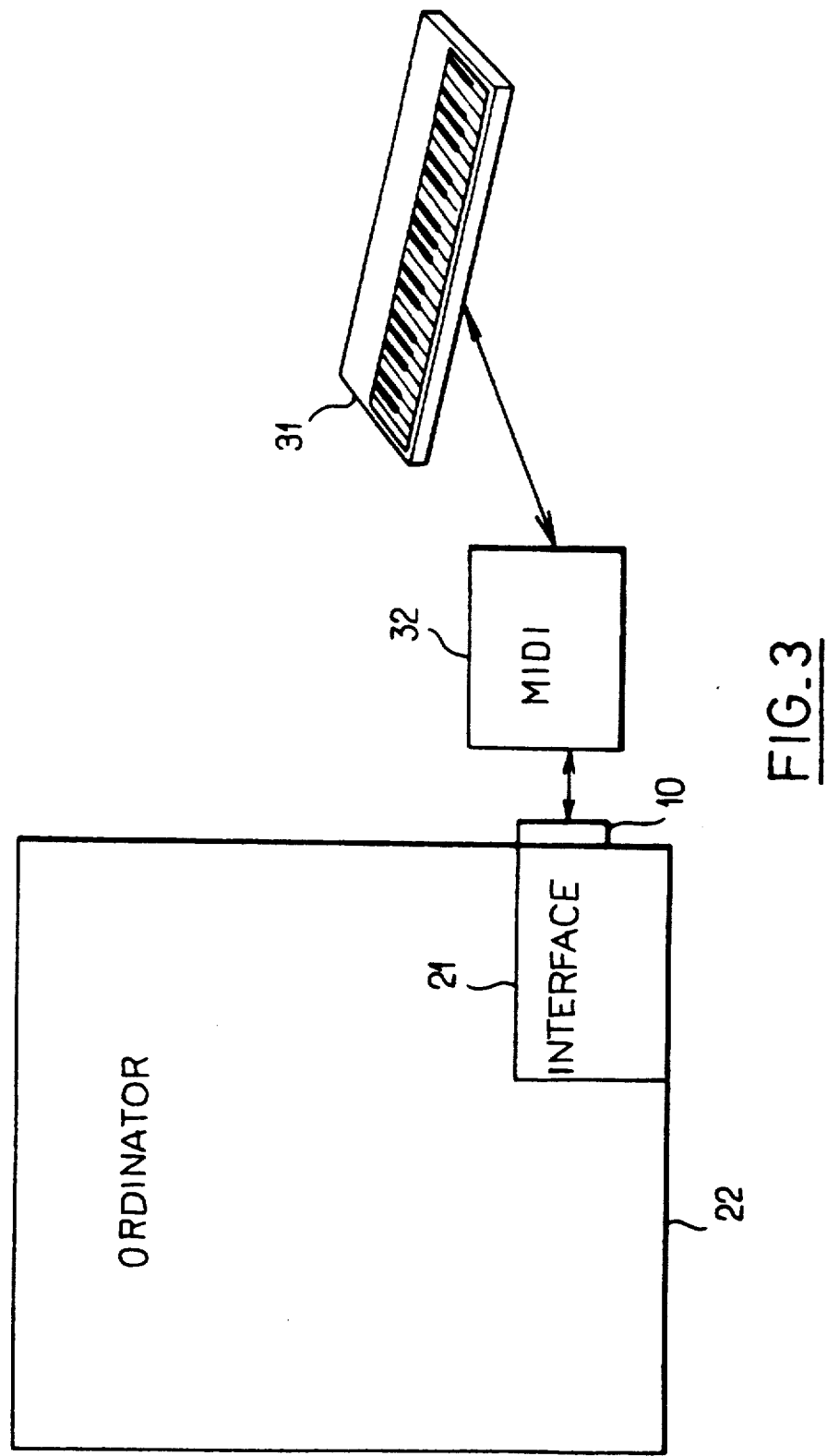
FIG. 3 is a diagram of a device according to the present invention.

FIG. 1 shows a digital instrument 22, for example a computer having a connector 10. The connector 10 is connected to an interface 21. The connections may be for the communication of data, for example digital data, between the computer and the exterior. On at least one of the contacts of the connector, there is an electrical supply obtained from the signal given by the interface 21. The electrical supply is obtained by amplification by amplifiers 30 of the signals given by the interface 21. The amplifiers 30 have to be capable of giving at least the current asked for by the external peripheral. However, it is possible to restrict the maximum current, for example to comply with standards.

It is clear that the invention is not restricted to computers, and that other devices having digital outputs such as, for example, digital synthesizers, digital optical disk readers and household appliances comprising the control interfaces do not go beyond the scope of the present invention.

FIG. 2 shows a particularly advantageous example of the device according to the present invention, concerning a serial interface and a male connector 10 of the SUB D9M type. The serial interface includes, for example, an integrated circuit 11 marketed by the firm NATIONAL SEMICONDUCTOR under reference 8250, an output buffer 13, marketed by the firm MOTOROLA under reference 1488 and two imput buffers 12 marketed by the firm MOTOROLA under reference 1489.

In the example shown in FIG. 2:

the terminal 1 is connected through a circuit 12 to the RLSD signal of the circuit 11;

the terminal 2 is connected through the circuit 12 to the SIN signal of the circuit 11;

the terminal 3 is connected through the circuit 13 to the SOUT signal of the circuit 11;

the terminal 4 is connected through the circuit 13 to the $\overline{DTR}$ signal of the circuit 11;

the terminal 5 is connected to the ground;

the terminal 7 is connected through the circuit 12 to the $\overline{DSR}$ signal of the circuit 11;

the terminal 7 is connected through the circuit 13 to the $\overline{RTS}$ signal of the circuit 11.

the terminal 8 is connected through the circuit 12 to the $\overline{CTS}$ signal of the circuit 11;

the terminal 9 is connected through the circuit 12 to the $\overline{RI}$ signal of the circuit 11.

In the device according to the present invention, it is imperative to determine a signal which, firstly, is liable to give the desired supply voltage and, secondly, is not disturbed by the presence of the amplification device. In the example illustrated in FIG. 2, the $\overline{DTR}$ signal is used. In the RS 232 serial interfaces, the $\overline{\text{DTR}}$ signal is equal to more than 12 volts to indicate a logic level "1" and is equal to less than 12 volts to indicate a logic level "0".

In the exemplary embodiment shown in FIG. 2, the output of the circuit 13 is connected firstly to the base of an NPN transistor 14 and, secondly, to the resistor 15. The resistor 15 is, for example, equal to 1000 ohms. The emitter of the transistor is connected to the terminal 4 of the connector 10. The collector of the transistor is connected to a +12 volts supply. During normal operation, when the MIDI interface is connected to the connector 10, the $\overline{\text{DTR}}$ signal is positive, the transistor 14 conducts the current and thus enables the supplying of the MIDI interface. In normal use of the RS 232 serial interface, when the voltage of the $\overline{\text{DTR}}$ signal is equal to +12 volts, this signal gets propagated to the terminal 4 without being modified by the transistor 14 of the resistor 15. On the other hand, when the $\overline{\text{DTR}}$ signal is equal to −12 volts, the transistor 14 is off and the signal passes by means of the resistor 15.

It is thus seen that the serial interface behaves exactly as usual but that, if it is necessary, it further enables the provision of an electrical supply. It is, of course, possible to restrict the maximum current liable to be put through by the serial interface for safety reasons or to comply with standards. For example, it is possible to take a transistor that cannot put through a current of more than 20 mA or to serially connect a resistor limiting the current.

If it is sought to give a negative current, advantageously a PNP transistor will be used, with a −12 volts signal.

FIG. 3 shows a computer 22 according to the present invention, connected by means of a MIDI interface 32 to a synthesizer 21 for example. The MIDI interface 32 is connected by means of the connector 10 of the RS 232 interface 21 to the computer 22. Should the MIDI interface 32 require a supply voltage of 5 volts, it comprises, for example, a 5-volt Zener diode placed between the outputs 5 and the outputs 4 of the connector 10. In the device according to the invention, it is possible to connect a computer 22 through a serial interface 21 and a 9-pin connector of the SUB D9M type to a MIDI interface 32. Thus, firstly there is a saving of a connector dedicated to the MIDI interface and, secondly, it is possible to reduce the size of the connector 10.

The invention can be applied to the making of interfaces capable of giving an electrical supply to an external device, as well as to computers having such interfaces.

The invention can be applied chiefly to the making of computers capable of working under the MS-DOS operating system and capable of giving a supply voltage to the MIDI interface by means of an RS 232 serial interface and a SUB D9M connector.

What is claimed is:

1. A computer interface, comprising:
   means for generating a signal having a first power level in a predetermined logic state during a period of time which a peripheral device connected to said interface requires power to be supplied thereto;
   means for amplifying said signal having said first power level to a second power level greater than said first power level, including a transistor, to produce an amplified signal to be used as a power source to said peripheral device; and
   means for supplying said amplified signal to power said peripheral device.

2. An interface according to claim 1, wherein the transistor comprises a NPN transistor.

3. An interface according to claim 2, comprising a resistor mounted between the base and emitter of the transistor.

4. An interface according to claim 1, wherein said interface comprises an RS 232 type serial interface.

5. An interface according to claim 4, wherein the DTR (Data Terminal Ready) signal of the RS 232 serial interface is used as said signal.

6. An interface according to claim 1, wherein said supplying means comprises a connector with nine connection pins, of the SUB D9M type.

7. A computer including an interface according to claim 1.

8. A computer according to claim 7, capable of working under the MS-DOS operating system.

9. A device including a MIDI interface and a computer wherein the MIDI interface is connected to the computer by means of the interface according to claim 1.

10. An interface according to claim 1, wherein:
    said peripheral device comprises a MIDI interface.

* * * * *